United States Patent [19]

Bloomfield

[11] 3,987,835

[45] Oct. 26, 1976

[54] DOUBLE CORD EDGE FASTENER

[75] Inventor: Roger D. Bloomfield, Jackson, Wyo.

[73] Assignee: Frank D. Werner, Jackson, Wyo.

[22] Filed: Oct. 29, 1974

[21] Appl. No.: 518,346

Related U.S. Application Data

[63] Continuation-in-part of Ser. No. 315,283, Dec. 15, 1972, abandoned, which is a continuation-in-part of Ser. No. 249,962, May 3, 1972, abandoned.

[52] U.S. Cl. .................. 160/392; 24/201 C; 24/243 K; 160/395; 160/403
[51] Int. Cl.² .................................. A47H 13/00
[58] Field of Search .......... 160/392, 387, 393, 394, 160/395, 396, 397, 400, 403, 371, 354, 368; 24/201 C, 243 K, 243 M, 243 N, 245 FF, 245 L, 245 R

[56] References Cited
UNITED STATES PATENTS

| | | | |
|---|---|---|---|
| 2,164,414 | 7/1939 | Long | 24/243 K UX |
| 2,736,521 | 2/1956 | Bosserman | 160/392 X |
| 2,823,721 | 2/1958 | Svec et al. | 24/201 C UX |
| 2,875,824 | 3/1959 | Rice | 160/392 X |
| 2,925,862 | 2/1960 | Sundby | 160/354 |
| 3,064,724 | 11/1962 | Nowell | 160/392 X |
| 3,225,407 | 12/1965 | Daniels | 160/392 X |
| 3,552,476 | 1/1971 | Le Tarte | 160/392 X |
| 3,757,479 | 9/1973 | Martinez | 160/392 X |

*Primary Examiner*—Philip C. Kannan
*Attorney, Agent, or Firm*—Dugger, Johnson & Westman

[57] ABSTRACT

A fastener for attaching a flexible cover or sheet, such as a canvas tarpaulin, to a structure to provide a cover for the structure, and also to provide an acceptable weather seal around the cover. The device comprises a channel member fixed to the structure to be covered, and used in cooperation with a lock member having a pair of bead portions attached to the cover. The bead portions are separated by a very flexible portion of material so that the outer bead portion will move easily with respect to the inner bead portion. The two bead portions are then inserted into the channel one at a time and once in the channel are held by a detent from releasing under normal tension loads on the cover.

18 Claims, 15 Drawing Figures

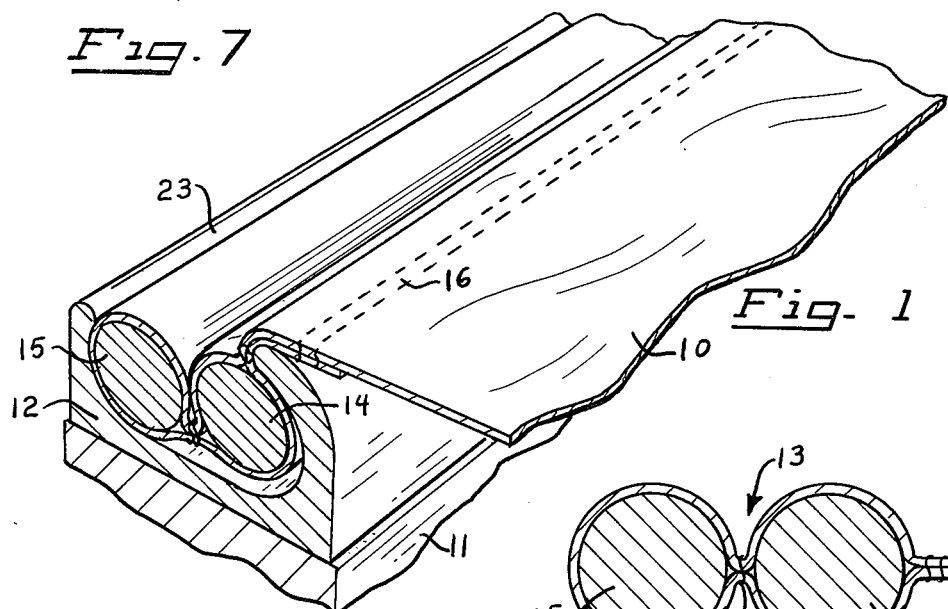
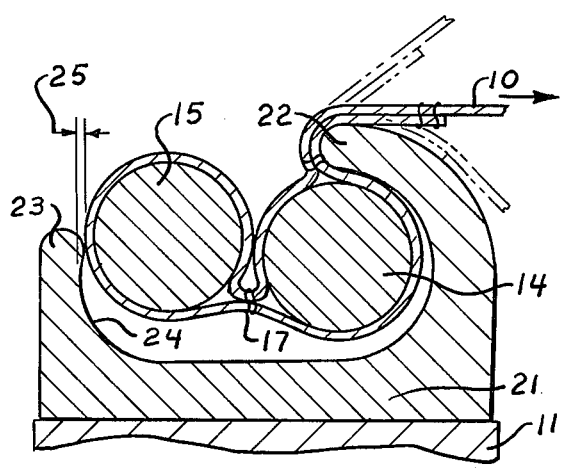
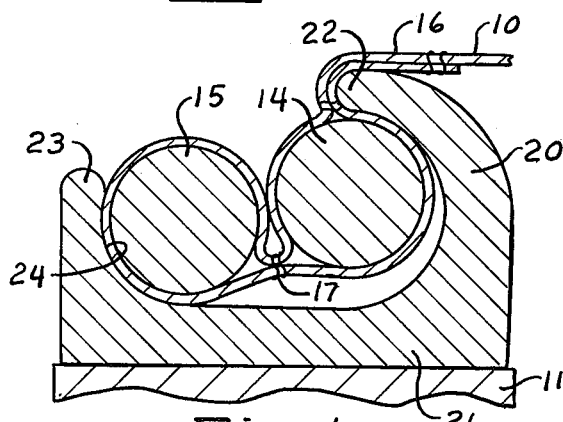
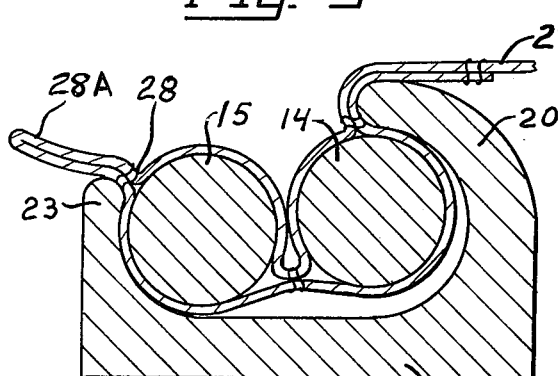
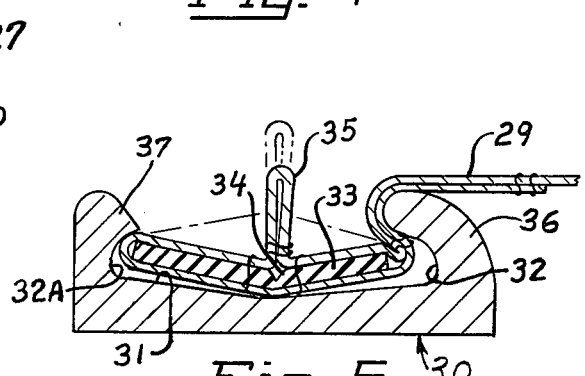

DOUBLE CORD EDGE FASTENER

CROSS REFERENCE TO RELATED APPLICATION

This application is a continuation-in-part of my copending application Ser. No. 315,283, filed Dec. 15, 1972 for Double Cord Edge Fastener, now abandoned, which in turn was a continuation-in-part of my then copending application Ser. No. 249,962, filed May 3, 1972 for Double Cord Edge Fastener, now abandoned.

BACKGROUND OF THE INVENTION

1. Field of the Invention

The present invention relates to fasteners for attaching flexible cover sheets to rigid structures.

2. Prior Art

In the prior art, many different interlocking attachment devices have been utilized for anchoring a sheet of the material, such as canvas, vinyl, polethylene or the like to another structure. Normal uses of such sheets include boat covers, swimming pool covers, machinery covers, tent structures, truck box covers and similar usages.

Some of the types of interlocking attachment devices that have been advanced include a clamp member shown in U.S. Pat. No. 2,914,776 issued Dec. 1, 1959 to L. F. Hotz. This device is an edge clamp or retainer for a swimming pool cover. A separate resilient member on the lock channel is used for locking a cylindrical member in the edge portion of the sheet in place and the resilient member has to actually be deformed out of the way in order to effect the locking action.

An awning fastener is shown in U.S. Pat. No. 1,492,405 issued Apr. 29, 1924 to J. H. Stone. These fasteners are short clips that are used to hold a flexible sheet through the use of a relatively rigid stiffening rod along the edges of the awning. Another form of a swimming pool cover using a spring loaded clamp is shown in U.S. Pat. No. 2,815,809 issued Dec. 10, 1957 to E. L. Jacobs et al.

A retractable cover assembly and draw cord carrier for the cover is shown in the U.S. Pat. No. 3,051,232 issued Aug. 28, 1962 to J. H. Lamb. Other interlocking devices include the device shown in U.S. Pat. No. 3,373,464 issued Mar. 19, 1968 to S. Ausnit; and another device is shown in U.S. Pat. No. 2,247,846 issued July 1, 1941 to B. Perlman.

None of these structures, however, completely solve the problems of easy attachment and ease of release, and relatively inexpensive manufacturing costs both from a standpoint of the materials used and the cost of construction.

SUMMARY OF THE INVENTION

The present invention relates to a low cost fastening assembly utilizing a channel on a structure, and mating interlocking members on a flexible sheet of material which will be called a cover so that the cover can be held in place with respect to the structure. The channel comprises a member shaped to receive the interlocking edge members of the cover. The channel may be extruded. The edge members as shown comprise a pair of bead portions flexibly attached to the edges of the flexible sheet, and having a flexible junction portion between the portions so that the portions can bend or flex relative to each other for insertion into the channel, and also for release from a detent recess in the channel.

The specific channel shown has a part cylindrical wall that is on the side of the channel toward the cover, and is generally on the side of the channel from which the load will come. This provides the main retaining member in cooperation with one of the locking bead portions. On the opposite side of the channel, another part cylindrical wall is provided which extends only to form a shallow concave locking detent for the outer edge bead lock member.

When tension load is placed on the cover the lock members seat securely in the lock channel, but can be removed readily by lifting the outer member out first.

BRIEF DESCRIPTION OF THE DRAWINGS

FIG. 1 is a perspective view of a flexible sheet or cover fastened at its edge in accordance with the present invention;

FIG. 2 is a sectional view showing edge lock cords fastened in place along an edge of a flexible sheet cover;

FIG. 3 is a sectional view showing edge cords being installed into a locking channel;

FIG. 4 is a sectional view of a locking channel and edge lock cords in place therein to hold a flexible cover on the locking channel;

FIG. 5 is a sectional view of a modified form of the invention;

FIG. 6 is a sectional view of a modified edge lock member using a flat member notched in the center to provide two sections which yield relative to one another for locking;

FIG. 7 is a side view of a modified lock cord construction;

DESCRIPTION OF THE PREFERRED EMBODIMENTS

Figure 8:
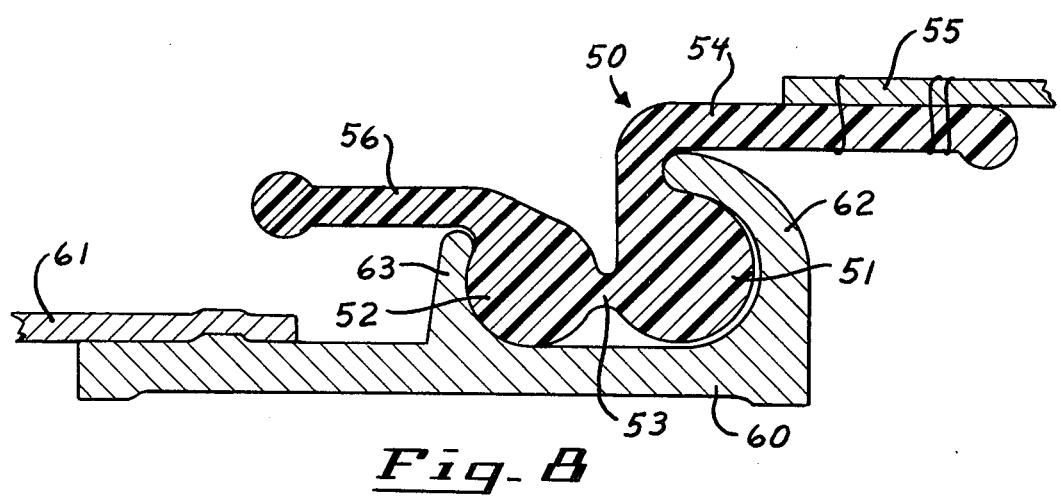
FIG. 8 is a sectional view of a further modified form of the invention showing an elastomeric cord shaped lock member.

Referring to FIG. 1, a flexible sheet or cover member indicated generally at 10 is fastened to a structure or base 11, which is to be covered, through the use of a rigid or semirigid locking channel 12. The locking channel 12 extends around the periphery of the structure to be covered a sufficient distance to provide for securing the flexible sheet 10. The channel 12 may be fastened to structure 11 in a desired manner, for example screws or adhesive.

The flexible sheet 10, which can be canvas or other flexible material, or can be plastic sheeting, has a hem area 13 around its peripheral edges which comprises a folded over portion of the material, and which encloses a first inner lock cord or member 14, which is generally cylindrical in cross section, and a second outer cylindrical lock cord or member 15. The cords or members are called cylindrical, but they do crush and deform, and are generally formed oval or cylindrical. These cords (or they could be ropes) as shown, are fastened in a hem of the material as it is folded back upon itself. The folded material is stitched as at 16 right next to the inner lock cord 14 and is also stitched as at 17 between the lock cords to separate the cords and form a separation between the cords along the stitching 17. The separation of the two cords makes the outer cord movable relative to the inner cord. The lock cords also are referred to as lock beads on the cover.

The flexible material or sheet 10 forming a cover is held at its edges by the channel 12. The length of the channel 12 can be varied as desired to fit the object to be covered. The channel 12 includes a first part cylindrical retainer wall 20, that is attached to a base wall 21 of the channel. The inner surface of wall 20 is of a diameter that is slightly larger than the outer diameter of the cord 14. The inner surface of walls 20 extends around in an arc for about 180° or less. A rounded edge portion 22 is provided at the outer end of wall 20 along the length of the channel. The flexible sheet 10 will slide on this rounded edge when the sheet is under tension in normal direction, away from the channel. A retainer wall 23 is on the opposite side of the channel.

When the lock cords are to be inserted into the channel, the inner lock cord 14 is slipped against the inner surface of the part cylindrical wall 20 through the opening of the channel as shown in FIG. 3, and the cover 10 folds around the rounded lip or edge 22. Then the outer cord 15 is forced into the opening defined by the outer end of the part cylindrical wall 20, and the retainer wall 23 on the opposite end of the base 21 from the wall 20 also as shown in FIG. 3. The cord 14 is pushed against wall 20 when cord 15 is forced into the channel. The upper end of wall 23 is rounded and this acts as a cam as the outer cord is forced into the channel. The retainer wall 23 has a part cylindrical inner surface 24 that extends only slightly more than 90° of arc. The amount of offset of surface 24 from the upper inner edge of the wall 23 to the most concave point of surface 24 comprises a detent offset indicated by the arrows 25. This offset is very small, but sufficient to hold the lock cord or member 15. The design limit is where the detent action approaches zero and the lock bead width approaches the full inside maximum dimension between the concave surfaces.

When a tension is placed on the flexible sheet 10, in direction generally away from the wall 20, cord 14 will be pulled against the inner surface of the wall 20 adjacent the upper part of the wall, and the cord 15 will be urged against the concave detent against the wall surface 24. As the pull or tension increases, the cord 15 will be forced against this surface 24 more tightly, and will force lock cord or member 14 against wall 20 to prevent cord 14 from slipping out of the channel. The direction of tension pull on the cover can vary across a wide arc without causing release of the locking cords. The lock cords or members provide a secure locking feature so that the flexible cover or member 10 will not be pulled out of the channel. Dotted line showings of the cover represent a normal range of direction of pull on the cover, which can occur without causing the cover to pull out of the channel. The cover is removed by first removing outer lock cord member 15 by prying it out or pulling on it with the fingers. Then lock cord 14 can be pulled out.

Referring to FIG. 5, a pair of cords 14 and 15 are also inserted into a channel 12, but in this instance the flexible member or cover 27 is made so that the hem area is stitched as at 28 on the outside of outer cord 15 to leave a pull tab 28A that extends along the longitudinal edge outside of the cord 15. This pull tab 28A aids in removing the cover from the lock channel. When the flexible sheet or cover 27 is to be removed from the channel 12, the pull tab 28A is pulled, and cord 15 is thus easily pulled out of the channel first. Then cord 14 can be pulled out. This is the way that the unit is removed. Namely the outer edge cord is removed first, just as it is inserted last in the opening between the walls 23 and 20, in order to made the device easy to put in and remove. If no pull tab is provided, the lock cord 15 can be pulled out by working it with the fingers so it comes out of the channel member. Small pull tabs could also be provided at spaced intervals along the cover, if desired for ease of removal.

For some purposes, it is advantageous to draw rope which is made of thermoplastic material through a die, with the application of heat, so as to render the rope more uniform in diameter and more resistant to compression and deformation.

The device is simple to make, and inexpensive to form into the hems which are common on tarpaulins or similar covers at the present time. The lock cords, such as quarter inch diameter manila ropes, are quite low in cost, and provide a wedge like holding action.

It should be noted that if desired the configuration of the two lock members in the hem area 13 of FIG. 2 could be molded from non-rigid plastic material with the reduced area between the lock members. Such plastic material lock members or cords could actually be molded integrally to a polyethelene sheet, or otherwise attached to the sheet to form the same type of structure. Likewise, a completely removable cord 15 (not fastened to the cover) could be used and provide a locking action in the channel described with a cord that was sewn into a hem.

A further modified form of the invention is shown in FIG. 6. A lock channel 30 has a bottom internal surface 31, and a pair of facing concave detent surfaces 32 and 32A formed in the side walls on opposite sides of the channel. The lock members may be made out of polypropylene, or other suitable plastic in a generally flat bar 33. A flexible cover 29 has the lock member 33 mounted in an edge hem of the flexible cover and stitched thereto along the inner edge of the member. The lock member has a V groove 34 defined therein and extending along the length thereof. This groove forms a hinging section forming two flat lock bead means that have reduced cross sectional area between the bead.

The flexible material cover 29 is also formed into a pull tab 35 above the groove 34 forming a hinge for the lock member. The flexible cover is connected to the lock member along the inner edge of the member so the pull on the cover forces the opposite edge of the lock member against the detent surface 32A. The flexible cover slides around the rounded edge surface of wall 36 so that tension force pushes the opposite edge of the lock member into the detent.

The side portions of lock member 33 will pivot or hinge relative to each other from a first removal position shown in dotted lines in FIG. 6. The locked portion is shown in solid lines in FIG. 6. The folding or hinging action actually aids in removal and insertion and upon pulling tab 35 the lock bar folds to a smaller dimension transversely for easy removal from the lock channel.

In assembly the lock member is positioned with the inner edge thereof at the opening of the channel adjacent surface 32, and the opposite edge of the lock member is pushed down on surface 37, forcing the inner edge under the upper portion of the wall 36 until the lock member moves into place and is held by detent surface 32A.

As shown in FIG. 7 a further variation of the lock member is to replace one or both ropes with generally cylindrical short bead sections 26 threaded on a string or otherwise held together. Such bead sections would have about the same outside diameter as the rope shown and could be made of any suitable material. Further, such bead sections could take the form of enlargements on a plastic line or strand used as a lock bead member and molded as a unit. Finally, the string or other joining means between the bead sections could be entirely omitted if desired, the short bead sections being merely positioned adjacent to one another to form the lock bead members. The hem would then hold them in position adequately, provided excessive gaps between bead sections are not allowed.

The cross section shape of the lock members can vary, but as shown it is generally cylindrical or oval, or it can be rectangular. The term lock bead or member includes molded members that are flexible along their length in the manner of a cord or rope or which are made up of short bead sections. The flexible lock bead members insure that the cover can be folded or rolled up for storage without reference.

The assembly can be used on a wide variety of different applications for joining two parts together.

The tension on the cover forcing the inner lock member against the wall 20 or 36 creates a fairly good weather seal between the cover or sheet and the inner surface of this wall to adequately protect the covered structure.

The rounded surface on end portion 22 at the top of the wall of the channel permits the flexible cover to slide so that substantially the same force urges the lock bead members toward the detent surface as the tension force in the flexible cover. This rounded surface in combination with the opposite detent surface provides secure locking force.

Referring to FIG. 8, a form of the invention is shown wherein an elastomeric double bead lock member is used. The features of the previous form of the invention are also present in the device of FIG. 8.

The molded or extruded member indicated generally at 50 is formed into a pair of elongated molded beads or cords, 51 and 52 that are joined together with a thin integral band or junction portion 53. The bead 51 has an integral molded tab 54 to which a flexible cover 55 may be attached. The bead 52 also has a pull tab 56 attached thereto for removal. The lock bead member may be made of neoprene rubber or other elastomer of suitable hardness. For example, a rubber of 68–73 durometer is satisfactory. The unit could be molded in an elongated member and then slit or cut longitudinally to separate the unit into elongated lock bead members with a flexible junction portion 53.

A lock channel 60 is attached to a fixed structure 61 and receives the lock bead members 51 and 52. The channel has a main retainer wall 62 and an opposite detent wall 63. The detent serves to lock the bead members in place as described before. The bead members can be inserted into the channel one at a time but lock in place from tension on cover 55.

As in the previous form of the invention the rounded outer end of the retainer wall 62 permits the mating portion of the tab 54 to slide from tension in the cover 55, pulling the bead member 51 upwardly and slightly away from the inner surface of the wall 62 and forcing the bead member 52 toward the detent of the wall 63. The reduced size junction portion 53 between the bead members 51 and 52 also acts as the stitched area between the beads or cords 14 and 15 in the first form of the invention. The outer or detent bead member 52 tends to roll outwardly when bead member 51 is moved and this tightly wedges the two bead members in the channel. The inner surface of wall 62 extends around for approximately 180 , to form a fairly deep overhang on the wall on the side of the channel toward the load.

The detent on the opposite wall is very shallow but forms a satisfactory retainer for the outer bead member 52. The bead member 52 is forced into the detent and is held securely. The outer bead member 52 tends to bend down and jam tightly when the bead member 51 is moved upwardly by tension in the flexible cover. It should be noted that the actual size of the channels and lock bead members is quite small. The interior width is only slightly over a quarter of an inch, and the outside height of the main wall 62 is also about a quarter of an inch. In devices of this general size a detent only about 0.008 inch deep is adequate. The bead members 51 and 52 are about  inch in diameter with bead member 52 being slightly smaller in diameter than bead member 51. The molded member may be any desired length and may be attached as a continuous edge member around the periphery of a flexible cover.

Figure 9:
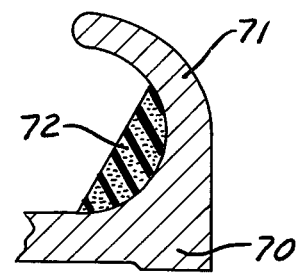
FIG. 9 is a sectional view of a typical lock channel showing a resilient insert for aiding in weather sealing.

FIG. 9 shows a chanel 70 that has a retainer wall 71. A flexible compressible strip 72 is provided along the channel in position for the inner bead of a lock member to compress against the strip 72 can be bonded on the interior of the channel and when compressed increases the weather and waterproofing of the channel.

The strip 72 can be placed in any of the channels shown and selected in size to meet the desired requirements.

The lock bead members may be fixed to the sheet in locations that are intermediate the sheet edges, for example in the center of the sheet lock bead members and a channel may be used to take up the slack in the center.

Figure 10:
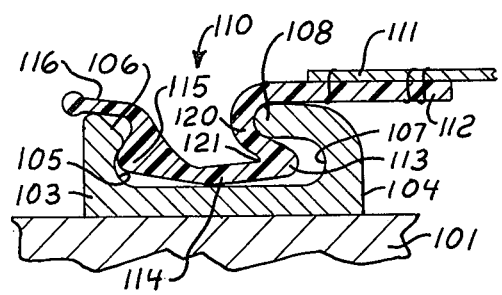
FIG. 10 is a cross sectional view of a further modified form of the elongated channel and elastomeric lock member.

In FIG. 10, an elastomeric lock member used with the same type of channel as the previous form of the invention is illustrated.

As shown, a lock channel 100 is mounted onto a support 101, and the channel has a base 102, a first wall 103, and a second main retainer wall 104. The first wall 103 has a very shallow detent concave surface indicated at 105 therein, forming the detent as in the previous forms of the invention, and the upper surface of the wall 103 has a rounded end and sloped or cam surface 106, as in the previous forms of the invention.

The main retainer wall 104 has a deep concave surface 107 facing the detent surface 105, and the upper portion indicated at 108 of the wall 104 forms a overhanging edge member. The end surface of the wall portion 108, and the edge between surfaces 105 and 106 of the wall 103 together define an opening that is unobstructed between the walls, and into which a lock member indicated generally at 110 is inserted when it is to hold a flexible sheet.

The flexible sheet 111 is attached (sewed for example) to a sewing tab 112 on the lock member 110, and as shown, the main portion of the lock member is offset from the tab 112. The tab is molded to fit around the rounded edge of wall portion 108, and forms a bead portion 113 that fits underneath the ledge formed by wall portion 108 and engages or moves toward concave surface 107. The lock member 110 has a generally flat or relatively small cross section flexible junction portion 114 extending over to a bead portion 115 comprising a detent bead that has an outer surface that engages the detent surface 105. The bead portion 115 is connected to a pull tab 116 that fits above the outside of the wall 103 and over the surface 106. It should be noted that the surfaces on the tab 116 facing surface 105 may mate with the upper edge of surface 105 and thus if the detent surface 105 is more concave than the surface of the tab 116 that faces surface 105 and 106, the detent interlock may be provided by the concave surface on the elastomeric lock member itself. The amount of interlock is thus limited.

As in the previous forms of the invention, the bead portions 113 and 115 are joined by the flexible junction portion 114, so that they can be flexed together (toward each other) and easily inserted by first inserting bead portion 113 into the deep concave area formed by surface 107, and then slipping the bead portion 115 into position locking against the wall 103. Partial insertion is shown in FIG. 11.

When tension is applied to the flexible sheet 111, the bead portion 113 will be pulled toward surface 107, and there will be a force acting around the rounded end of wall 108 tending to move the bead portion 115 and junction portion 114 in direction toward the wall 103. The detent bead portion 115 engages the detent surface and locks it in place under tension as previously explained.

It should be noted that the bead portion 113 is partially formed by a molded curved section 120. This curved section forms an undercut area or recess 121 with respect to the flexible portion 114, and this undercut area reduces the cross sectional area so that as tension is applied in the sheet 111, the force acting around the rounded wall portion 108 tends to create a force toward wall 103, rather than creating too much of a lifting force upwardly tending to move the lock member out of the channel. Thus, the undercut area 121 is desirable to reduce the cross section of the lock member and to prevent such lifting which tends to force the lock member out of the channel. The undercut is formed by the overhanging portion and the junction portion. The deep concave surface permits bead 113 to extend thereunder a substantial distance and thus the undercut can be formed without harming the holding power of the bead portion 113.

Figure 11:
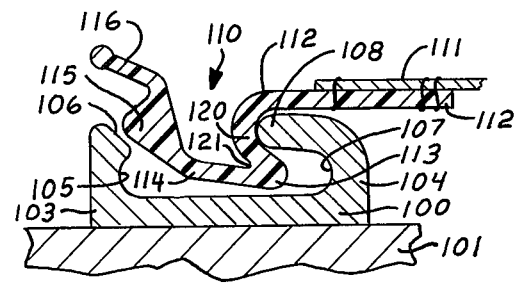
FIG. 11 is a cross sectional view of the channel of FIG. 10 showing a locking member partially in the channel.

Referring specifically to FIG. 11, it can be seen that on insertion of the lock member 110, the bead portion 113 is slid under the ledge formed by wall portion 108, and the flexing that is necessary to cause this insertion occurs mainly in the area 120 of the tab and in the center of the flexible portion 114. The detent bead 115 will snap into the surface 105 quite easily because of the flexible portion in much the same way as in the forms of the invention previously shown. It is the ability to flex the two lock bead portions toward each other to permit insertion that aids in use of the unit. Very little compression of the elastomeric material is necessary, and rather bending occurs as previously explained. The portion 120 is part of the tab 112 and the undercut or recess 121 is formed adjacent the location where portions 114 and 120 join bead portion 113. The reduced junction portion 114 extends the major distance between the edges of the lock member and thus the bead portions 113 and 115 are widely separated. The cross section length of flexible section 114 is about equal to the width of the space between the edges of walls 103 and 104 which define the opening of the channel.

The elastomeric members such as 110 can be extruded from suitable elastomeric material such as neoprene rubber, and are produced in longitudinally extending strips which extends in a longitudinal direction of the channel. As shown, the length of the channel and the lock strips or members can be selected as desired. The pull tab 116 can be eliminated if desired, but in its general form the tab that extends out through the channel opening is desirable for ease of insertion and removal.

A very shallow detent surface 105 is all that is necessary, being only several thousandths of an inch, for example 0.008 inches deep, and the surface 107 forms a very deep concave surface providing a substantial overhang several times deeper than the detent surface. The main holding force is provided by the wall 104, and the transfer of tension forces around the rounded edge of wall portion 108. The holding power of the deep concave surface insures adequate locking, and the detent surface keeps the lock bead portion 115 from slipping out or snapping out of the channel.

This form of the invention permits insertion into a channel without substantially compressing the bead portions. The bead portions are inserted one at a time, and the flexible junction portion between the bead portions permits bending of the bead portions relative to each other for such insertions. The bead portions do fit one at a time into the opening of the channel, and then engage into the respective concave surfaces.

Figure 12:
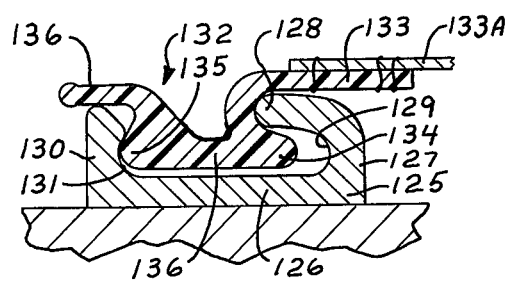
FIG. 12 is a cross sectional view of another form of the invention.
Figure 13:
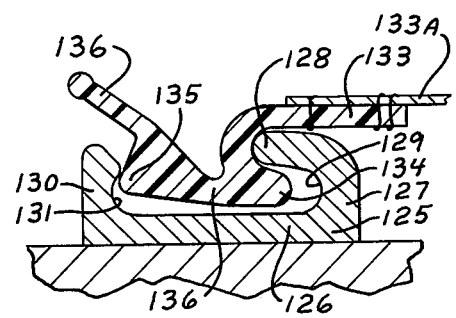
FIG. 13 is a cross sectional view showing the lock member of FIG. 12 partially in the channel.

FIGS. 12 and 13 show a further modified form of the invention fitting within a channel member 125, that has a base 126, a first main retaining wall 127 with an upper portion 128 forming a deep concave surface 129 on one side of the channel, and an upright wall 130 on the opposite side of the channel with a shallow concave detent surface 131 defined on the interior thereof facing surface 129. The channel configuration is the same as that disclosed in the previous form of the invention. The lock member indicated generally at 132 in this particular instance has a tab 133 for attachment of a flexible sheet 133A as previously explained, and the tab is in turn joined to a first bead portion 134, which is connected to a second bead portion 135 through a flexible reduced cross sectional junction portion 136 that permits bending of the two bead portions 134 and 135 with respect to each other. The bead portion 135 has an exterior tab 136A thereon for removing the bead portion 135 from engagement with the detent surface 131 of the channel in which the member is inserted, and thus releasing the lock member.

It can be seen that the lock member 132 has a substantially planar bottom surface even in the flexible junction portion 136. The bending between the bead portions can be permitted for insertion of the members into the channel or removal, as shown in FIG. 13. Very little compression is used for insertion, and the bead portion 134 fits into the recess formed by concave surface 129 so that the bead portion 131 will slip across the upper edge of wall 130 and into the detent concave surface 131.

Thus, the bead portions in this form again will move together when the unit is bent in junction portion 136. The form of the lock member shown in FIGS. 12 and 13 is also extruded from an elastomeric material, such as neoprene or other suitable elastomeric material to form a lock member of desired length that can be attached to flexible covers. It can be noted that the tab 133 will act as a flexible member tending to slide around the rounded edge of wall portion 128 to force the bead 135 against the detent surface 131 and cause a tight locking action. The member will withstand forces across a wide range of angles and still hold securely.

Figure 14:
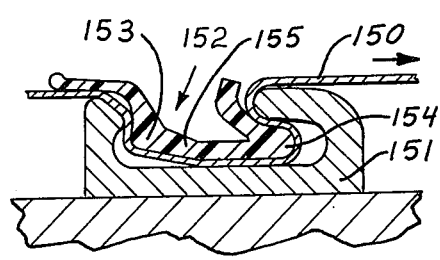
FIG. 14 is a cross sectional view of a lock member similar to that shown in FIG. 10 which is used without sewing it to the flexible cover.

In FIG. 14, it is shown how a lock member or fastener member such as that shown in FIGS. 10 and 11 can be used without sewing it to the flexible sheet. The flexible sheet indicated generally at 150 is merely placed into a channel member 151 which has a base, and a pair of walls with one forming a deep concave surface and the other a detent surface, and then a fastener or lock member 152 conforming generally in configuration to that shown in FIGS. 10 and 11 with the sewing tab removed is merely slipped into place on top of the sheet as shown, and forms a holding function in the same manner as previously described. The tension in the sheet 150 will be transferred around the rounded edge of the wall having the deep concave surface to force the detent bead portion 153 against the detent surface of the channel, while the second bead portion 154 that is joined to the bead portion 153 with the flexible portion 155 will remain under the overhanging portion of the wall forming the deep concave surface of the channel 151.

In some instances, use of a loose strip such as that shown in FIG. 14 will cause the flexible portion between the beads to tend to compress too much to permit the bead portion 154 to roll out of the channel. A lock member similar to that shown in FIG. 15 will overcome this problem.

Figure 15:
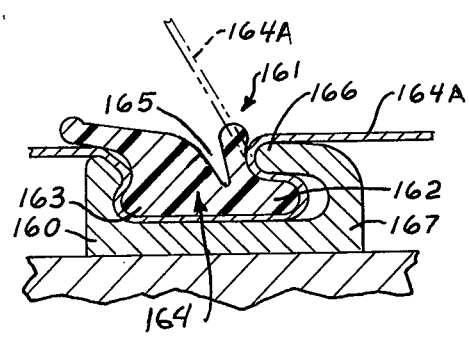
FIG. 15 is another form of lock member which may be used without sewing it to the flexible cover.

In FIG. 15, a lock channel 160 is shown, and it includes the two upright walls, one forming a deep concave surface and the other forming a shallow detent surface. A lock member 161 having a first bead portion 162 and a second bead portion 163 is positioned in the channel. A flexible sheet or cover 164 is positioned under the lock member and is held in place thereby. The lock member is not sewn or fixed to the flexible sheet 164. The bead portions 162 and 163 are joined together by a flexible section 164 as in the previous forms of the invention, but the flexible portion is formed by a relatively narrow gap 165 that will close if a backward pull is put on the sheet, as indicated generally in dotted lines in FIG. 15, to prevent the bead portion 162 from rolling out from under the overhanging ledge 166 of the wall 167 of the channel 160. Closing of gap 165 causes the bead portion 163 to be forced tightly against the detent surface on the detent surface of the channel and to prevent the bead portion 162 from being forced out of the channel 160.

In this manner, a loose lock member or strip that is of a molded elastomeric material having two bead portions that are separated by a flexible section to permit insertion and removal is used and yet it will prevent removal from reverse force in the same manner as the earlier forms of the invention. The loose strip is effectively locked and retained to the flexible sheet. The sheet is clamped in place and also frictionally engages the loose strip.

It should be noted that the durometer range for the lock members may range up to 95 Shore A durometer in hardness, particularly where the bead portions are widely separated.

What is claimed is:

1. A cover assembly comprising a flexible sheet of material, a rigid lock channel, and elongated bead means positioned in said lock channel and engaging said flexible sheet so that said flexible sheet is retained with respect to said bead means and lock channel, said bead means having spaced, coextensive longitudinal edge portions and being movable in said lock channel from tension forces in said flexible sheet, said lock channel having a base and a pair of upstand wall means fixed to said base and spaced apart to form an opening at upper edges thereof, and said wall means having facing concave surfaces, one of said wall means having a rounded upper edge over which said flexible sheet extends, said one wall means forming one of said concave surfaces to be substantially more concave than the other concave surface to permit one longitudinal edge portion of said bead means to nest into said substantially more concave surface so the opposite longitudinal edge portion of said bead means clears the upper edge of the other wall means for insertion into the lock channel, and means comprising a lock bead member forming the opposite longitudinal edge portion of said bead means and positioned in said lock channel so that when said bead means engages said one concave surface from tension in said flexible sheet transferred around the rounded edge tending to pull said bead means out of said lock channel the lock bead member will be forced by other portions of said bead means to engage the other wall means of said lock channel to prevent said bead means from moving through said opening in the lock channel when said flexible sheet is under tension load, said other concave surface forming a shallow detent surface for the lock bead member to permit releasing said lock bead member from the detent surface under small external upward forces applied thereto.

2. The combination of claim 1 wherein said bead means and lock bead member are molded elastomeric material, and means joining said lock bead member to said bead means through a reduced cross section portion to permit flexing of said lock bead member relative to said bead means.

3. The combination as specified in claim 2 wherein said reduced cross section portion is defined by surfaces positioned to close and cause the lock bead member and bead means to engage each other when force on said flexible sheet is generally in a direction from the one wall means toward the other wall means of said channel.

4. The combination of claim 2 wherein said means joining comprises a generally flat portion extending for a length equal to a major portion of the distance between said wall of said channel.

5. The combination of claim 1 wherein said flexible sheet is positioned in said channel and frictionally engages said bead means and lock bead member.

6. The combination of claim 1 and a first tab molded to said bead member and being offset from said bead member to extend out of said channel, said flexible sheet being fixed to said first tab.

7. The combination as specified in claim 1 wherein said lock bead member and said bead means are molded elastomeric material, and a generally flat flexible molded elastomeric member joining said lock bead member and said bead means, said flat member being of length between said lock bead member and bead means a distance equal to a major portion of the distance between the walls of said channel, a tab member molded to said lock bead member and formed to fit around said one wall so that said lock bead member fits a substantial distance into the concave surface formed by said one wall, said tab member forming a concave recess in combination with said flat member adjacent to the location where said flat member and tab member join said lock bead member.

8. A locking assembly for locking a flexible cover in place on a structure comprising a first member having a first upright wall, said first upright wall having a first concave surface extending along the length of said member and forming an overhanging ledge member, second wall means spaced from said first upright wall and defining in combination with the concave surface of said first upright wall a channel opening, said second wall means having a second concave detent surface facing the concave surface of said first upright wall, a flexible sheet of material, a pair of side by side separable lock bead members encompassed within a folded over hem portion of said flexible sheet, said hem portion joining said lock bead members to each other in side by side relationship and a seam between said lock bead members forming a reduced cross sectional area between said lock bead members whereby said lock bead members can be bent toward and away from each other through said reduced cross sectional area for insertion between said first upright wall and said second wall means, said flexible sheet being loaded against the upper edge of said first upright wall under force generally in a direction from said second wall means toward said first upright wall and said flexible sheet extending away from said first upright wall in said direction, a first of said lock bead members being forced under the ledge member and engaging said first concave surface when moved by force from said flexible sheet in said direction, and the second of said lock bead members engaging said concave detent surface, said first and second concave surface being spaced apart so that the first of said lock bead members is forced under the ledge member on the first upright wall when the second of the lock bead members is in engagement with the second concave detent surface, said lock bead members thereby being retained between said concave surfaces.

9. The combination specified in claim 8 wherein said concave surface on said first wall is of sufficient concave depth to permit said first of said bead members to move into the area defined by said concave surface of said first wall while the outer of said lock bead members is inserted between said first wall and said wall means.

10. The combination specified in claim 8 wherein the first concave surface of said channel is substantially more concave than the second concave surface.

11. The combination specified in claim 8 wherein said lock bead members comprise elongated cord like members attached to said flexible cover at the peripheral edge portions of said cover and said second lock bead member is the outer member.

12. The combination of claim 8 wherein said lock bead members comprise elongated thermoplastic rope sized through a hot die.

13. The combination of claim 8 wherein said lock bead members comprise a plurality of individual bead sections and means to retain said bead sections adjacent each other to comprise the elongated bead members.

14. In combination, an elastomeric lock member and a channel having a base and coextensive walls extending from the base, each of said walls having a concave surface facing the other wall, said walls being spaced apart a preselected distance to define an unobstructed opening therebetween facing away from said base, a first of said walls defining a deep concave surface; said lock member being positioned in said unobstructed opening of said channel between the walls thereof and comprising flexible elastomeric material and having first means adjacent said first wall for attachment to a flexible sheet, said first means extending in a first direction, a first bead member molded integrally with the first means and being offset from said first means, and a detent portion substantially coextensive with said first bead member, said detent portion extending in a direction from said first bead member opposite from the extension of said first means from said first bead member, and means joining said detent portion and said first bead member together including a resilient flexible section molded to the detent portion and first bead member and permitting bending movement of the detent portion relative to said first bead member in the region of said flexible section whereby said first bead member and said detent portion can be bent toward each other for insertion between the walls of said channel, and said flexible section permitting said bead member and detent portion to bend relative to each other to a position so that said bead member and detent portion tightly engage the respective walls of said channel when force is applied to said first means, said first means being offset sufficiently to extend around the first wall of the channel and outside said channel, and said detent portion and other wall of said channel having mating surfaces which provide only a shallow insertion of the detent portion into the concave surface of said other wall.

15. The combination as specified in claim 14 wherein said first bead member includes a part cylindrical surface which is received by said deep concave surface, and said detent portion comprises a second bead member, said means joining said second bead member to said first bead member comprising a substantially reduced cross sectional area between said bead members at least partially defined by a recess formed between said members on a side of said bead members facing away from the base of said channel.

16. The combination as specified in claim 15 wherein said means joining said second bead member to said first bead member forms a generally flat surface facing said base of said channel.

17. In combination, a molded elastomeric lock member and an open top channel, said channel comprising a base and two side wall portions having facing concave surfaces extending from said base, said molded elastomeric lock member having a first tab member adapted to be attached to a flexible sheet, and two adjacent lock portions integrally molded together and a first lock portion being molded to the tab member, said lock portions being positioned in said channel, and of size to together engage both of said concave surfaces, said tab member being offset from said lock portions so that said tab member extends outside of said channel through said open top, said tab member extending in a direction at an acute angle to and over one of said side wall portions and away from the other side wall portion of said channel, said two lock portions being joined to each other by a flexible junction portion integrally molded with said lock portions, said flexible junction portion being at least partially formed by a recess which separates said first of said lock portions from a second of said lock portions, said second lock portion being connected to said first lock portion only by said flexible junction portion to permit said second lock portion to move relative to said first lock portion and said tab member for insertion and removal of said lock portions into and out of said open top channel, the concave surface formed by said other side wall and said second lock portion engaging to form a shallow interlock of said last mentioned concave surface and second lock portion to permit ready removal of said second lock portion from the channel upon application of a force thereto in direction upwardly from said base of said channel.

18. The combination of claim 17 and a second tab member molded to said second lock portion and extending to the exterior of said channel, for application of a force to the second lock portion upwardly from said base of said channel.

* * * * *

UNITED STATES PATENT AND TRADEMARK OFFICE
CERTIFICATE OF CORRECTION

PATENT NO. : 3,987,835
DATED : October 26, 1976
INVENTOR(S) : Roger D. Bloomfield It is certified that error appears in the above-identified patent and that said Letters Patent are hereby corrected as shown below:

Column 5, line 35 "reference" should be --interference--. Column 6, line 19 "180" should be --180°--; Column 6, line 33 "about    inch" should be --about 1/8 inch--; Column 6, line 53 after "as" insert --in--. Column 10, line 18, (Claim 1, line 9) "upstand" should be --upstanding--;

Signed and Sealed this

Twelfth Day of April 1977

[SEAL]

Attest:

RUTH C. MASON
Attesting Officer

C. MARSHALL DANN
Commissioner of Patents and Trademarks